(12) United States Patent
Yung

(10) Patent No.: US 6,247,392 B1
(45) Date of Patent: Jun. 19, 2001

(54) COOKING UTENSILS

(75) Inventor: Jimmy Siu Yim Yung, New Territories (HK)

(73) Assignee: Chiaphua Industries Limited (HK)

( * ) Notice: Subject to any disclaimer, the term of this patent is extended or adjusted under 35 U.S.C. 154(b) by 0 days.

(21) Appl. No.: 09/498,086

(22) Filed: Feb. 4, 2000

Related U.S. Application Data

(63) Continuation-in-part of application No. 09/132,044, filed on Aug. 11, 1998, now abandoned.

(51) Int. Cl.⁷ .............................. A47J 27/00; B65D 21/02
(52) U.S. Cl. .................. 99/340; 99/426; 99/422; 99/376; 220/23.87; 220/573.1; 220/912
(58) Field of Search ............................. 99/422, 372, 376, 99/340, 380, 426, 447; 206/592, 515; 220/23.37, 912, 408, 573.1; 126/373, 376, 387, 389, 390

(56) References Cited

U.S. PATENT DOCUMENTS

| | | | |
|---|---|---|---|
| Re. 32,994 | * 7/1989 | Adamson et al. | 99/349 X |
| 2,939,606 | * 6/1960 | Durbin | 99/422 X |
| 3,632,962 | 1/1972 | Cherniak . | |
| 4,178,500 | 12/1979 | Brindopke . | |
| 4,320,699 | * 3/1982 | Binks | 99/349 |
| 4,646,717 | * 3/1987 | Baggioli | 126/373 |
| 4,700,619 | 10/1987 | Scanlon . | |
| 5,070,775 | * 12/1991 | Blake | 99/349 |
| 5,515,990 | * 5/1996 | Popeil et al. | 220/23.87 X |

FOREIGN PATENT DOCUMENTS 07100070    4/1995  (JP) .

* cited by examiner

*Primary Examiner*—Reginald L. Alexander
(74) *Attorney, Agent, or Firm*—Jackson Walker L.L.P.

(57) ABSTRACT

A multi-pie maker of generally conventional form is provided with metallic liners that fit snugly against opposing heatable complex surfaces of platens. The liners are preformed into self supporting complimentary shapes that match and fit snugly against the complex heatable surfaces of the platens. The liners are readily removable for washing and cleaning, or replacement when necessary.

6 Claims, 3 Drawing Sheets

COOKING UTENSILS

This is a continuation-in-part of U.S. Ser. No. 09/132,044, filed Aug. 11, 1998 now abandoned.

BACKGROUND OF THE INVENTION

1. Field of the Invention

The invention relates to cooking utensils.

2. Description of Prior Art

The food contacting surfaces of cooking utensils are commonly formed of or coated with non-stick materials so that such surfaces are more easily kept clean. Nevertheless non-stick coatings are subject to damage and wear, even when washed and rubbed with normal cleaning cloths and pads available in the kitchen. More often than not, the contacting surfaces include crevices and ledges where it is difficult to remove burnt-on foodstuffs and it is often impossible to soak the utensil suitably in water to loosen stuck-on foodstuffs. Such problems arise in a griddle or sandwich toaster which are preferably formed with a complex, e.g. patterned, contacting surface.

SUMMARY OF THE INVENTION

It is an object of the invention to reduce or overcome this problem.

According to the invention there is provided a cooking utensil having heatable complex contact surface for preparing foodstuff including a removable self-supporting complimentary shaped liner formed of heat conducting material formed to mate with and fit snugly against at least a major part of the contacting surface, including releasable holding means to maintain said liner in intimate contact with said contacting surface, said liner retaining said complimentary shape upon removal from said utensil.

The liner is preferably formed with a non-stick coating that contacts the foodstuff in use.

The liner may extend to some extent beyond the heatable contact surfaces.

The liner is preferably formed of alumina.

The cooking utensil may have heatable contact surfaces formed by a metallic plate and the liner have a thickness that is less than 50% of the thickness of the plate.

The cooking utensil may comprise one of a sandwich maker, a griddle and a multi-pie maker.

BRIEF DESCRIPTION OF THE DRAWINGS

Cooking utensils according to the invention will now be described by way of example with reference to the accompanying drawings in which.

DESCRIPTION OF THE PREFERRED EMBODIMENT

Figure 1:
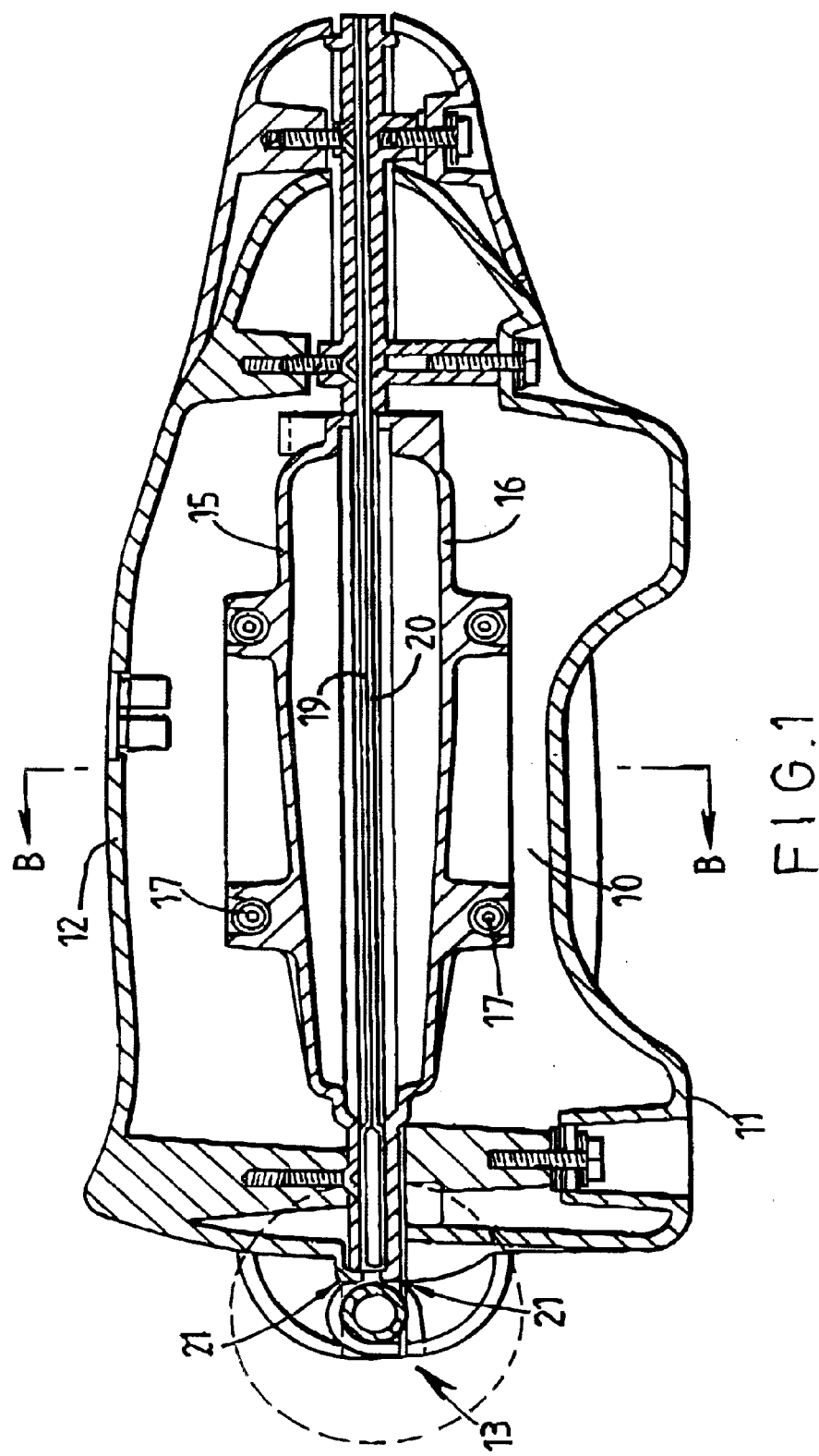
FIG. 1 is a sectional side view of the multi-pie maker.
Figure 2:
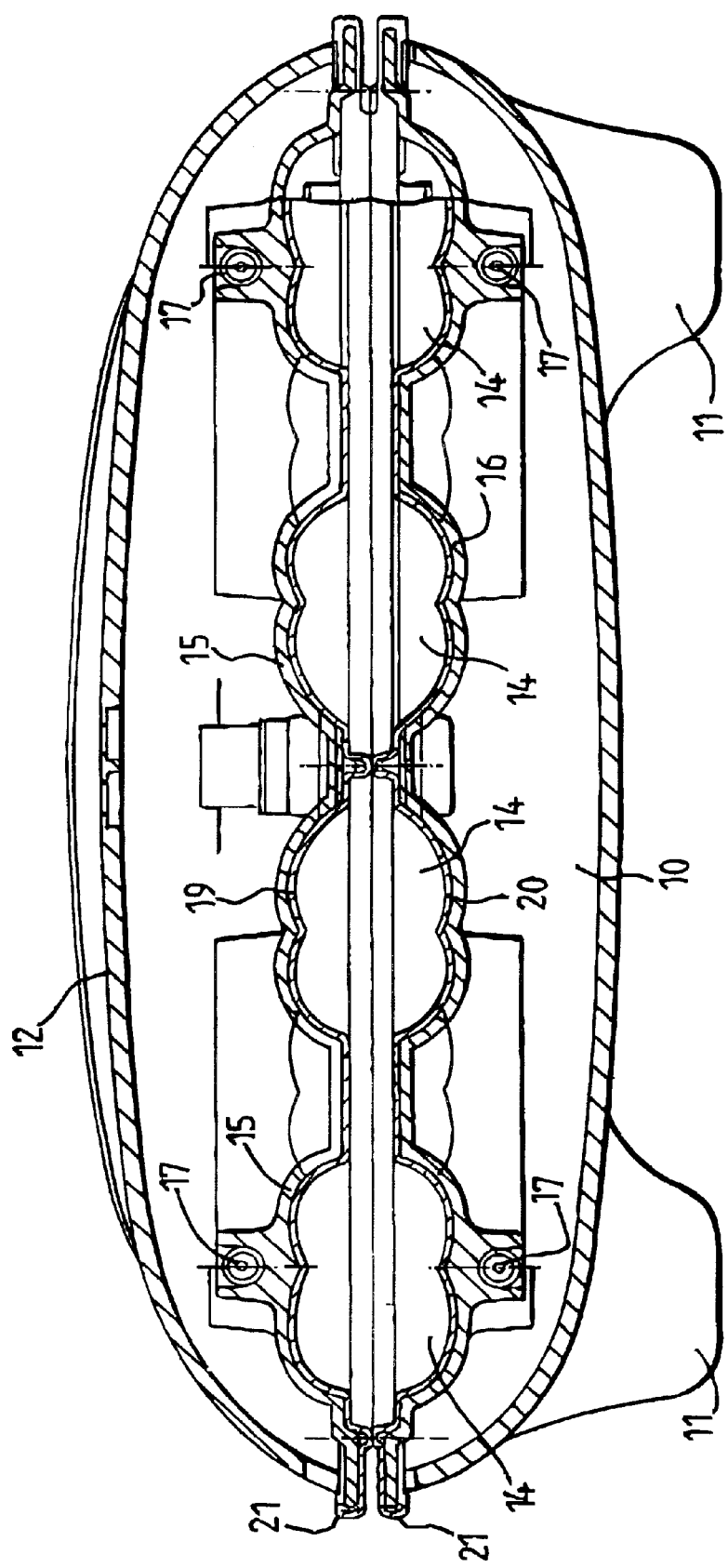
FIG. 2 is a sectional view taken along B—B of FIG. 1.

Referring to the drawings, in FIGS. 1 and 2 the multi-pie maker is of generally conventional form and comprises a base 10 with four supporting legs 11. A lid 12 is connected to the base 10 by a hinge 13 to enable the lid to open to allow uncooked pies to be placed in and removed from shaped cavities 14 before and after cooking. The lid may be held closed by means not shown, or may remain closed normally under its own weight, during cooking for example.

Upper and lower die-cast platens 15 and 16 are respectively fixed to the lid 12 and the base 10 as shown and are heated by electrical elements 17 and 18 when the multi-pie maker is turned ON in a manner already well-known. Two alumina liners 19 and 20 fit snugly against the opposing heatable surfaces of the platens 15 and 16. The liners 19 and 20 are pre-formed into self-supporting complimentary shapes that match and fit sungly against the complex heatable surfaces of the platens as shown. The liners are formed at least at one of their edges with bent-over lips 21 that releasably hold the liners to the respective platens during normal use.

The liners 19 and 20 may be removed at regular intervals for washing and cleaning, and for total immersion in water if necessary. On the other hand, the liners may be arranged to remove only when no longer serviceable, when they have lost their shape to some extent or are too dirty or contaminated with foodstuff reminants or burnt-on deposits. Replacement liners are readily provided and used as required.

It will be noted that the liners 19 and 20 extend beyond the effective heatable regions of the platens 15 and 16, to very close to the pivotable axis of the hinge 13 for example. As such, the liners 19 and 20 completely cover any area to where foodstuff may normally spill or to where foodstuff may migrate during cooking. In other words, no foodstuff can normally contact the multi-pie maker parts, except for the exposed surfaces of the liners.

The liners 19 and 20 are made of metal preferably aluminum or alloys thereof. The foodstuff contacting or normally exposed surfaces of the liners are preferably coated with non-stick material. The normally exposed surfaces may also be somewhat differently shaped as compared to their rear surfaces that snugly fit to the platen surfaces, to form in use chosen external patterns on the pies for example. In this respect, two or more types of liners may be used in the same cooking utensil to enable different patterned pies to be prepared at the choice of the user.

The thickness of the liners is less than 50% of the thickness of the heatable platen surfaces and preferably about 20% of that thickness. Typically, for a domestic pie maker, the thickness of the liners are between 0.6 mm to 1 mm.

Figure 3:
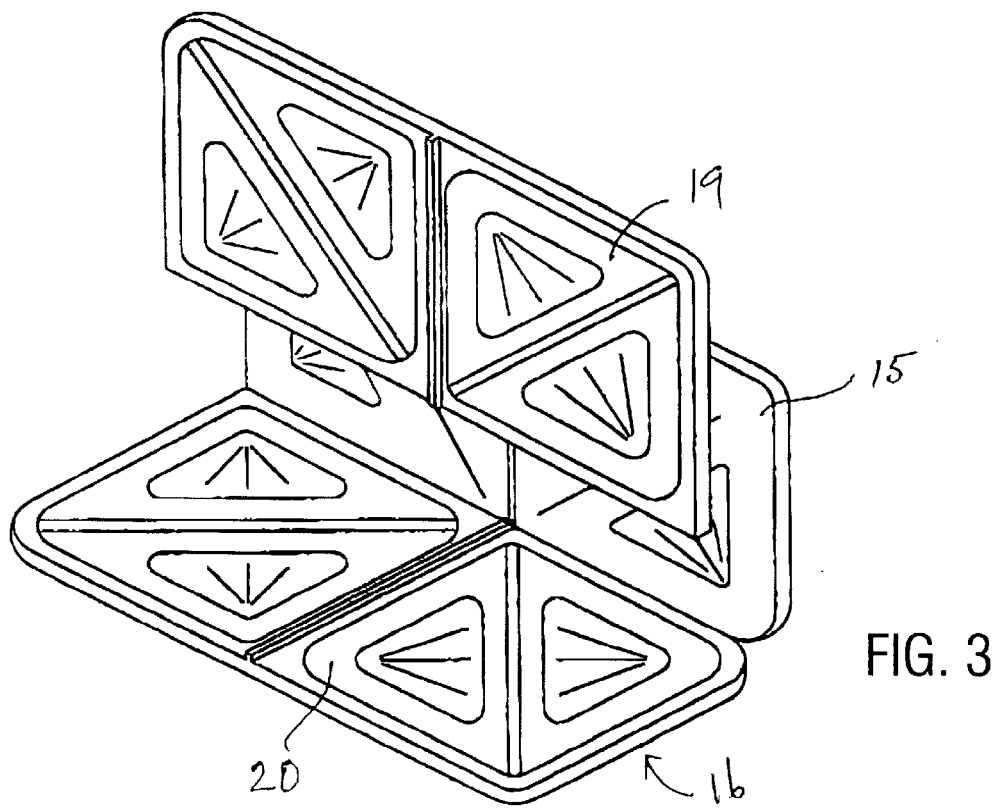
FIG. 3 is an isometric view of a sandwich toaster.
Figure 4:
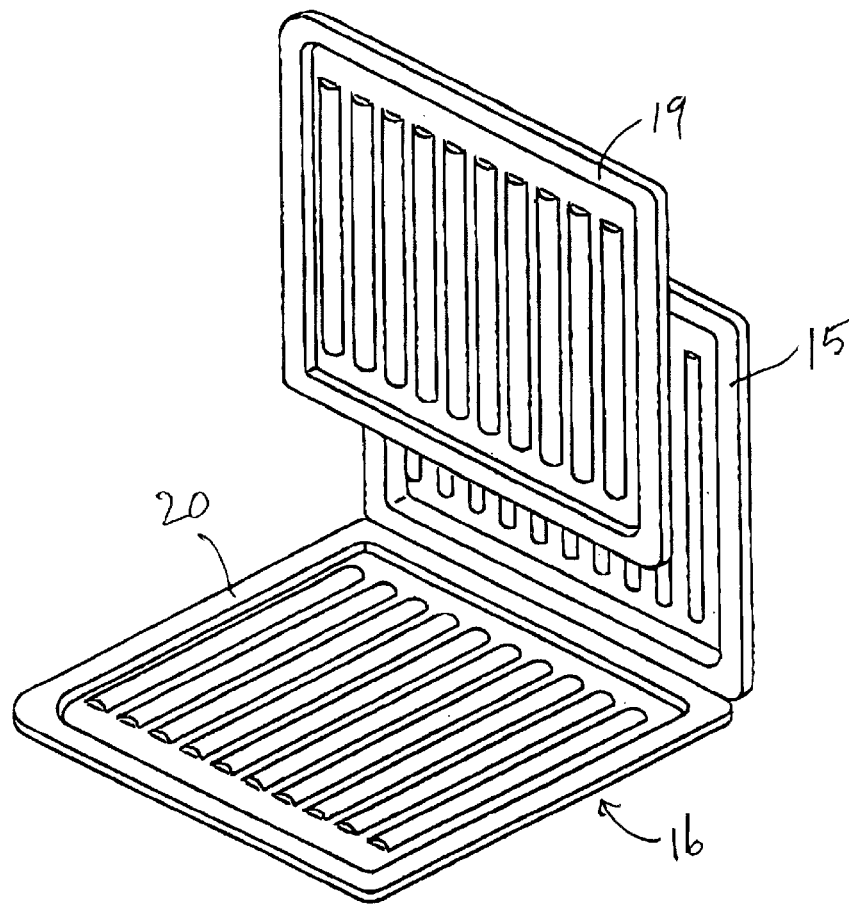
FIG. 4 is an isometric view of a griddle.

Embodiments of the invention include other cooking utensils such as sandwich toasters and griddles, shown respectively in FIGS. 3 and 4. Like parts are given like numbers to the numbers in FIGS. 1 and 2. In each of FIGS. 3 and 4, an upper liner is shown removed from its contact surface to better illustrate that such contacts surfaces are "complex shaped". The various complex shaping which is preferred to increase the contact or heat-transfer area between the contact surface and the liner, normally improve in use at the food-contacting surfaces, provide better cooking of the food and in some cases patterns on the exterior of the cooked food.

In prior art arrangements it has been proposed to provide liners made of flexible thin sheets that conform to complex contact surfaces but only when the liners are pressed against food in the utensil. Such liners may be removed after use but do not retain any complex shaping and, generally stated, are not re-usable and are disposable. It has also been proposed to provide rigid liners where the contact surfaces are planar. Such liners normally retain their shape and can be removed for washing and replacement. Planar contacting between the liner and the heating surface is not secure or continuous in practical use and so heat-transfer efficiency will be low.

Rigid self-supporting liners with complimentary complex surfaces have not previously been proposed despite their providing clear practical advantages in heat transfer efficiency.

The liners are made preferably of aluminum or alloys thereof. As such the materials of the liners can be readily pressed to adopt required complimentary shapes to provide matching with complex surfaces of the contact surfaces as required, in a normal metal press. The liners are coated, on at least on one major surface, with non-stick material. The liners are then work-hardened by cold-working in a soft press. That is to say, the liners are work hardened in a press having "soft" dies that do not alter the complimentary pattern on the major surfaces but cyclically flex the liners to cause some bending as necessary. This work-hardening makes the liner material rigid and the liners self-supporting.

I claim:

1. A cooking utensil having heatable complex, multiple cavity contact surface for preparing foodstuff comprising a removable, generally non-flexible, complimentary multiple cavity shaped liner formed of heat conducting material preformed to mate with and fit snugly against at least a major part of the contacting surface, including releasable holding means to maintain said liner in intimate contact with said contacting surface, said liner retaining said complimentary multiple cavity shape upon removal from said utensil such that said liner may be reused.

2. A cooking utensil according to claim 1, in which the liner is formed with a non-stick coating that contacts the foodstuff in use.

3. A cooking utensil according to claim 1, in which the liner extends to some extent beyond the heatable contact surfaces.

4. A cooking utensil according to claim 1, in which the liner is formed of aluminum.

5. A cooking utensil according to claim 1, having heatable complex contact surfaces formed by a metallic plate in which the liner has a thickness that is less than 50% of the thickness of the plate.

6. A cooking utensil according to claim 1, wherein said heat conducting material has a thickness in the range of approximately 0.6 mm to approximately 1.0 mm.

* * * * *